INVENTOR.
Richard C. Stewart
BY John C. deVerier
Abbitt Spear,
ATTORNEY

March 13, 1962 R. C. STEWART ETAL 3,025,406
LIGHT SCREEN FOR BALLISTIC USES
Filed Feb. 5, 1959 2 Sheets-Sheet 2

INVENTORS
Richard C. Stewart
BY John C. de Vernier
Ablett Spear
ATTORNEY 3,025,406
LIGHT SCREEN FOR BALLISTIC USES
Richard C. Stewart, Boxboro, and John C. de Verrier, Cambridge, Mass., assignors to Flightex Fabrics, Inc., Providence, R.I., a corporation of Rhode Island
Filed Feb. 5, 1959, Ser. No. 791,371
7 Claims. (Cl. 250—220)

The present invention relates to light screens for ballistic uses.

The velocity of a projectile is determined by arranging two stations along the path of the projectile. As the projectile passes through the first station, it actuates means to initiate the operation of the timing mechanism and, as the projectile passes through the other station, it actuates means to terminate the operation of that mechanism. At each station, there is a screen and, whether it is in the form of a metal screen, reticulated or foil, in a triggering circuit or a light screen consisting of a sheet of light derived from an appropriate light source and directed against a suitable light responsive device in the triggering circuit, trouble is experienced in the actuation of the means controlling the timing mechanism. This trouble is due to the fact that the projectile is commonly of such relatively small cross sectional area, as compared with the dimensions of the screen, that the passing of the projectile therethrough has an unreliable and small effect on the triggering circuits.

The elimination of this objectionable characteristic of light screens for ballistic uses is the principal objective of the present invention and, in accordance with it, that objective is attained by providing a light screen consisting of a pair of opposed, spaced, parallel mirrors and a light beam establishing source located and disposed to direct a beam for reflection from one mirror to the other along a zigzag pathway. At least a portion of the pathway constitutes the screen with the maximum distance between proximate courses being such that an object, the projectile whose velocity is being timed, of predetermined cross-sectional area cannot pass therebetween without intersecting at least one of them. A light responsive device located at the end of the pathway to receive the beam becomes a reliable monitor of the associated triggering circuit because the light beam is relatively small in relation to the area of the screen and may be smaller than the cross-sectional area of the projectile.

Other objectives of the invention are concerned with light shielding, adjustments of the mirrors to ensure parallelism, adjustments of the angular relation of the light source and the beam receiver relative to the mirrors, and the provision of a structure that combines simplicity of manufacture with adaptability to meet the various requirements of use.

Figure 1:
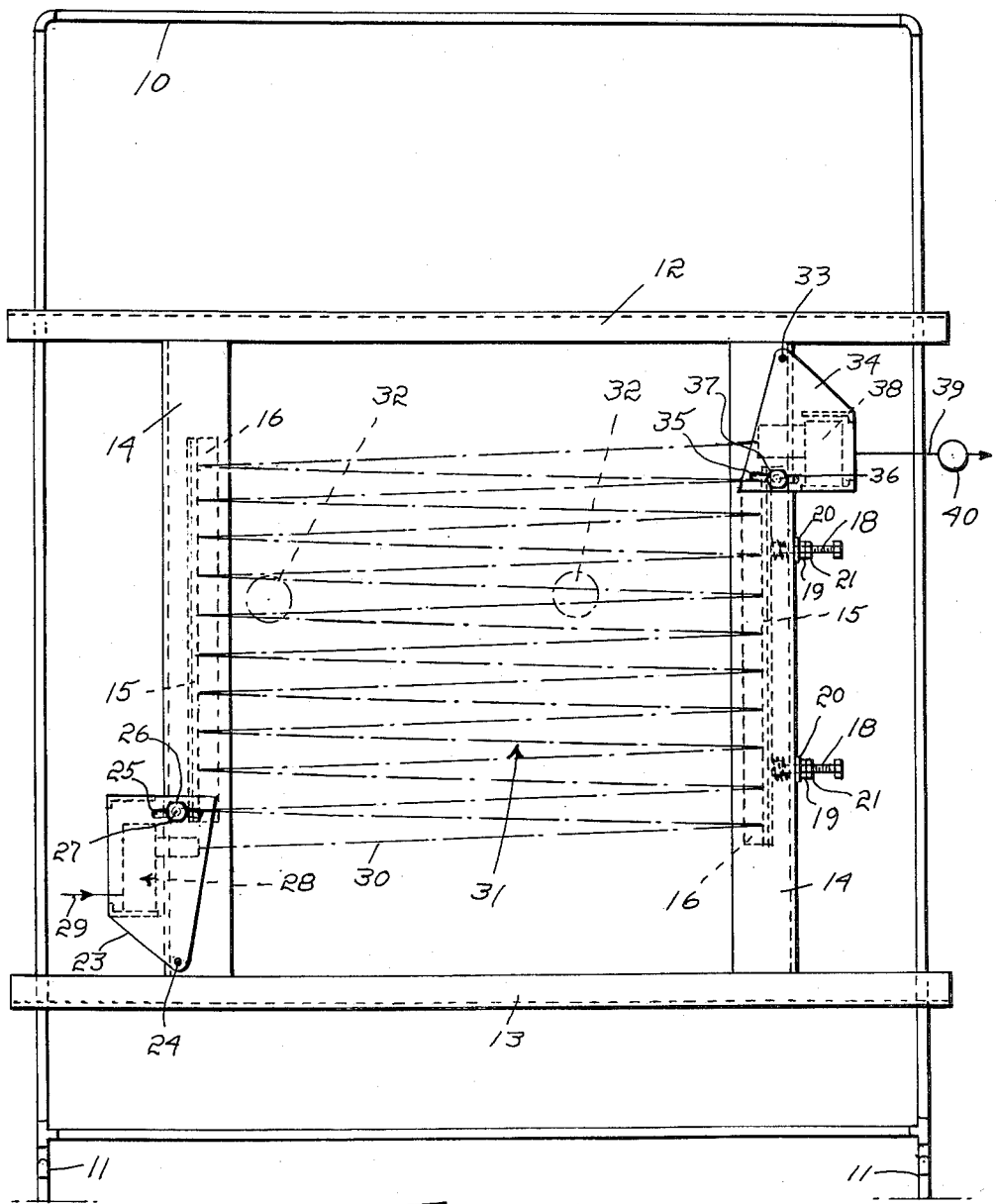
Figure 2:
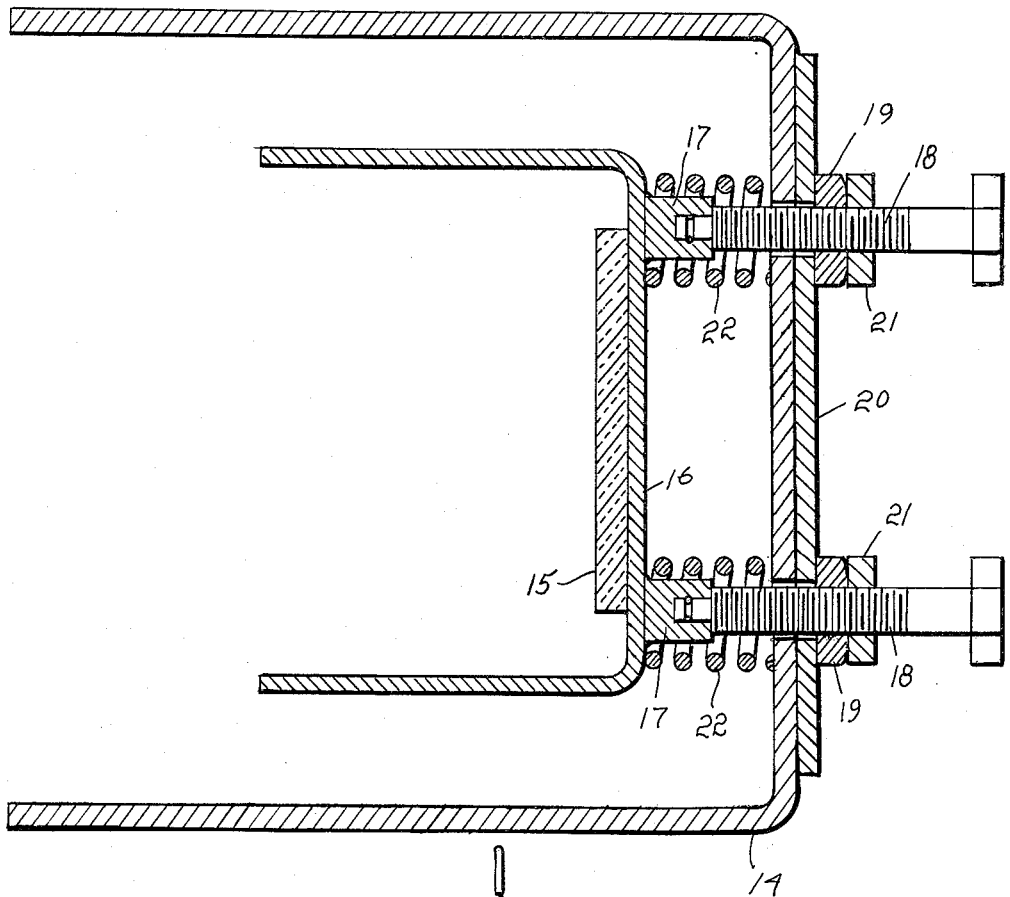
Figure 3:
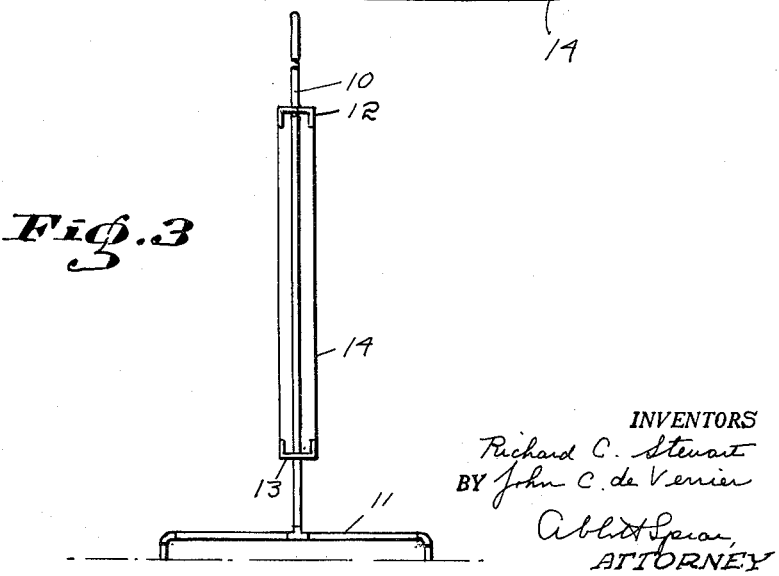

In the accompanying drawings, there is shown an illustrative embodiment of the invention from which these and other of its objectives, novel features, and advantages will be readily apparent. In the drawings, FIG. 1 is a front elevation of a screen in accordance with the invention, FIG. 2 is a cross section, on an enlarged scale, taken through one of the mirror housings, and FIG. 3 is an end view, on a reduced scale, of the screen.

In the embodiment of the invention shown in the drawings, there is shown a frame 10 provided with supporting legs 11. Parallel top and bottom members 12 and 13 are attached to the sides of the frame 10 and these are shown as of U-shaped section and opening towards each other to receive the ends of parallel side housings 14. The housings 14 are also shown as of U-shaped section and opening towards each other.

Within each of the housings 14, there is a mirror 15 carried by a mount 16 which is preferably of U-shaped section and considerably narrower and shallower than the housing 14 by which it is effectively shielded against ambient light. At least one of the mounts 16 has vertically spaced pairs of bosses 17 to each of which a screw 18 is rotatably connected. Each screw 18 is threaded through a nut 19 fast on a plate 20 secured to the outer face of the end wall of the housing 14 of that mount and is provided with a lock nut 21. Between the end wall of that housing 14 and the part of the mount 16 to which the screws 18 are attached there are coiled springs 22, each located by an appropriate one of the screws 18 and operative to eliminate any backlash therefrom in its use in adjusting the associated mirror 15 into parallel with the other mirror.

A holder 23 is pivoted as at 24 to one of the housings 14 so that it can be swung relative thereto within the limits of the slot 25 and locked in any adjusted position as by means of a nut 26 on the end of the bolt 27 extending through its slot 25. Within the holder 23, there is a light source, generally indicated at 28 and having an indicated lead 29 for a suitable source, not shown. The light source is arranged and disposed to direct a beam of light 30 against the mirror 15 in the other housing at an angle that will cause mirror-to-mirror reflection along a zigzag pathway. At least, a portion of that pathway constitutes a screen, generally indicated at 31, in which the maximum distance between proximate courses is less than the cross-sectional area of a projectile indicated at 32 so that it cannot pass therebetween without intersecting at least one of them.

Pivotably attached as at 33 to one of the housings 14 is a holder 34 adapted to swing relative thereto within the limits of the slot 35 through which extends a bolt 36 carrying a nut 37 by which the holder 34 may be locked in any adjusted position relative to the housing 14 to which it is connected. Within the holder 34, there is a light responsive device 38 in control of the triggering circuit 39 and the holder 34 is, in use, so adjusted that the last course of the pathway is beamed at the device 38. The circuit 39 may include an indicated light meter 40.

It will be appreciated that the light source and the light responsive device may be adjusted to enable the screen defining pathway to be accurately established for objects of different cross-sectional areas.

The term "intersecting" as used herein, means that the light beam is cut off entirely by the approximately complete interruption of one course of the pathway by the projectile or by the interference with or cutting into of two proximate pathway courses to effect an approximately complete interruption of the light beam, and also that the light beam is so affected by the interference or cutting into of at least one of two proximate courses that positive operation of the light responsive device is assured. By way of example, a preferred maximum spacing is such that a projectile cuts at least halfway into two proximate courses. With this arrangement, approximately complete interruption results because those courses are mirror reversals. Obviously, many light responsive devices function reliably without requiring complete interruption of the light beam directed therein and, in fact, such devices are presently available that function satisfactorily on even less than a 50% light interference. It is the sensitivity of the light responsive device that determines the minimum amount of beam intersection and hence the spacing of the pathway courses.

What we therefore claim and desire to secure by Letters Patent is:

1. In a light screen for ballistic uses, a pair of spaced, parallel, U-shaped housings opening towards each other, mirrors, one for each housing and located therein and including a mount, adjustable means connecting one mount to a respective one of said housings with its mirror disposed towards the mirror in the other housing to receive light reflected therefrom, a beam establishing light source including means attached to one housing adjacent one end of one mount and disposed to direct the beam against the corresponding end of the mirror of the other mount at an angle relative thereto to effect mirror-to-mirror reflection along a zigzag pathway, said means being adjustable to enable said angle to be varied, at least a portion of said pathway exposed between said housings constituting a screen with the maximum distance between proximate courses being such that an object of predetermined cross sectional area cannot pass therebetween without intersecting at least one of them, and a light responsive device including means attached to one housing adjacent the other end of one of said mirror mounts to receive the beam at the other end of said pathway and adjustable as required by said pathway, and mirror adjusting means operable to vary the light reflecting relationship between said mirrors to control the zigzag reflection.

2. In a light screen for ballistic uses, a pair of spaced, parallel, U-shaped housings opening towards each other, mirrors, one for each housing and located therein and including a mount, adjustable means connecting one mount to a respective one of said housings with its mirror disposed towards the mirror in the other housing to receive light reflected therefrom, a beam establishing light source including means attached to one housing adjacent one end of one mount and disposed to direct the beam against the corresponding end of the mirror of the other mount at an angle relative thereto to effect mirror-to-mirror reflection along a zigzag pathway, said means being adjustable to enable said angle to be varied, at least a portion of said pathway exposed between said housings constituting a screen with the maximum distance between proximate courses being such that an object of predetermined cross sectional area cannot pass therebetween without intersecting at least one of them, and a light responsive device including means attached to one housing adjacent the other end of one of said mirror mounts to receive the beam at the other end of said pathway and adjustable as required by said pathway, and mirror adjusting means operable to vary the light reflecting relationship between said mirrors to control the zigzag reflection, said mirror adjusting means being adjustable to change said relationship with respect to side-to-side tilting.

3. In a light screen for ballistic uses, a pair of spaced, parallel, U-shaped housings opening towards each other, mirrors, one for each housing and located therein and including a mount, adjustable means connecting one mount to a respective one of said housings with its mirror disposed towards the mirror in the other housing to receive light reflected therefrom, a beam establishing light source including means attached to one housing adjacent one end of one mount and disposed to direct the beam against the corresponding end of the mirror of the other mount at an angle relative thereto to effect mirror-to-mirror reflection along a zigzag pathway, said means being adjustable to enable said angle to be varied, at least a portion of said pathway exposed between said housings constituting a screen with a maximum distance between proximate courses being such that an object of predetermined cross sectional area cannot pass therebetween without intersecting at least one of them, and a light responsive device including means attached to one housing adjacent the other end of one of said mirror mounts to receive the beam at the other end of said pathway, and adjustable as required by said pathway, and mirror adjusting means operable to vary the light reflecting relationship between said mirrors to control the zigzag reflection, said mirror adjusting means being adjustable to change said relationship with respect to fore and aft tilting.

4. In a light screen for ballistic uses, a pair of spaced, parallel, U-shaped housings opening towards each other, mirrors, one for each housing and located therein and including a mount, adjustable means connecting one mount to a respective one of said housings with its mirror disposed towards the mirror in the other housing to receive light reflected therefrom, a beam establishing light source including means attached to one housing adjacent one end of one mount and disposed to direct the beam against the corresponding end of the mirror of the other mount at an angle relative thereto to effect mirror-to-mirror reflection along a zigzag pathway, said means being adjustable to enable said angle to be varied, at least a portion of said pathway exposed between said housings constituting a screen with the maximum distance between proximate courses being such that an object of predetermined cross sectional area cannot pass therebetween without intersecting at least one of them, and a light responsive device including means attached to one housing adjacent the other end of one of said mirror mounts to receive the beam at the other end of said pathway and adjustable as required by said pathway, and mirror adjusting means operable to vary the light reflecting relationship between said mirrors to control the zigzag reflection, said mirror adjusting means being adjustable to change said relationship with respect to both side-to-side tilting and fore and aft tilting.

5. In a light screen for ballistic uses, a pair of spaced, parallel, U-shaped housings opening towards each other, mirrors, one for each housing and located therein and including a mount, adjustable means connecting one mount to a respective one of said housings with its mirror disposed towards the mirror in the other housing to receive light reflected therefrom, a beam establishing light source including means attached to one housing adjacent one end of one mount and disposed to direct the beam against the corresponding end of the mirror of the other mount at an angle relative thereto to effect mirror-to-mirror reflection along a zigzag pathway, said means being adjustable to enable said angle to be varied, at least a portion of said pathway exposed between said housings constituting a screen with the maximum distance between proximate courses being such that an object of predetermined cross sectional area cannot pass therebetween without intersecting at least one of them, and a light responsive device including means attached to one housing adjacent the other end of one of said mirror mounts to receive the beam at the other end of said pathway and adjustable as required by said pathway, and mirror adjusting means operable to vary the light reflecting relationship between said mirrors to control the zigzag reflections, said last named means comprising a series of adjusting screws threaded through a housing and rotatably connected to the mirror mount located therein and a coiled spring carried by each screw between that housing and the mount connected thereto.

6. The screen of claim 5 in which the series consists of a transversely spaced upper pair of screws and a transversely spaced lower pair of screws.

7. In a light screen for ballistic uses, a pair of spaced, parallel, U-shaped housings opening towards each other, mirrors, one for each housing and located therein and including a mount, adjustable means connecting one mount to a respective one of said housings with its mirror disposed towards the mirror in the other housing to receive light reflected therefrom, a beam establishing light source including means attached to one housing adjacent one end of one mount and disposed to direct the beam against the corresponding end of the mirror of the other mount at an angle relative thereto to effect mirror-to-mirror reflection along a zigzag pathway, said means being adjustable to enable said angle to be varied, at least a portion of said pathway exposed between said housings constituting a screen with the maximum distance between proximate courses being such that an object of predetermined cross sectional area cannot pass therebetween without intersecting at least one of them, and a light responsive device including means attached to one housing adjacent the other end of one of said mirror mounts to receive the beam at the other end of said pathway and adjustable as required by said pathway, and mirror adjusting means operable to vary the light reflecting relationship between said mirror to control the zigzag reflections, said first and second named means comprising assemblies, each pivoted to an appropriate one of said housings and including adjustable means for interlocking engagement therewith.

References Cited in the file of this patent

UNITED STATES PATENTS

| | | |
|---|---|---|
| 1,887,209 | Lucas | Nov. 8, 1932 |
| 2,113,899 | Oram | Apr. 12, 1938 |
| 2,202,060 | Mitchell | May 28, 1940 |
| 2,613,933 | Johns et al. | Oct. 14, 1952 |

FOREIGN PATENTS

| | | |
|---|---|---|
| 753,867 | France | Aug. 21, 1933 |
| 765,353 | Germany | Sept. 28, 1953 |